United States Patent [19]

Meiners

[11] 4,424,676
[45] Jan. 10, 1984

[54] SUPPLEMENTARY FUEL INJECTION SYSTEM FOR A TURBOCHARGED INTERNAL COMBUSTION ENGINE

[75] Inventor: Elmo R. Meiners, Anchor, Ill.

[73] Assignee: M & W Gear Company, Gibson City, Ill.

[21] Appl. No.: 313,646

[22] Filed: Oct. 22, 1981

Related U.S. Application Data

[63] Continuation-in-part of Ser. No. 75,527, Sep. 12, 1979, abandoned.

[51] Int. Cl.³ .................. F02B 37/00; F02D 19/12
[52] U.S. Cl. .................................... 60/605; 123/25 L; 123/577
[58] Field of Search ............ 60/605; 123/25 A, 25 E, 123/25 J, 25 L, 25 N, 559, 575, 577

[56] References Cited

U.S. PATENT DOCUMENTS

| | | | |
|---|---|---|---|
| 2,495,231 | 1/1950 | Dickey | 123/25 L |
| 2,556,985 | 6/1951 | Sparrow et al. | 123/25 L |
| 3,845,745 | 11/1974 | Dunlap et al. | 123/25 J X |

FOREIGN PATENT DOCUMENTS 769044 10/1980 U.S.S.R. .................. 123/25 A

*Primary Examiner*—Michael Koczo
*Attorney, Agent, or Firm*—Allegretti, Newitt, Witcoff & McAndrews, Ltd.

[57] ABSTRACT

An improved turbocharger system for a diesel engine includes a turbocharger driven by the exhaust gases of the engine. Air is compressed by the turbocharger prior to admission to the engine intake manifold. An auxiliary fuel tank filled with an alcohol and water mixture is pressurized by compressed air from a line connected to the turbocharger outlet. An auxiliary fuel line connects the fuel take to the intake manifold. So long as the auxiliary tank pressure is below a threshold pressure, a control valve maintains the auxiliary fuel line in closed condition. Upon exceeding the threshold pressure, the valve opens and the water and alcohol mixture is driven by an auxiliary pump and injected into the intake manifold. The outlet pressure of the turbocharger controls the initiation and quantity of fuel provided from the auxiliary fuel tank to the intake manifold. Thus, the auxilliary fuel quantity is substantially directly proportional to the work being performed by the engine and is automatically adjusted to compensate for changes in engine loading, speed and torque.

7 Claims, 2 Drawing Figures

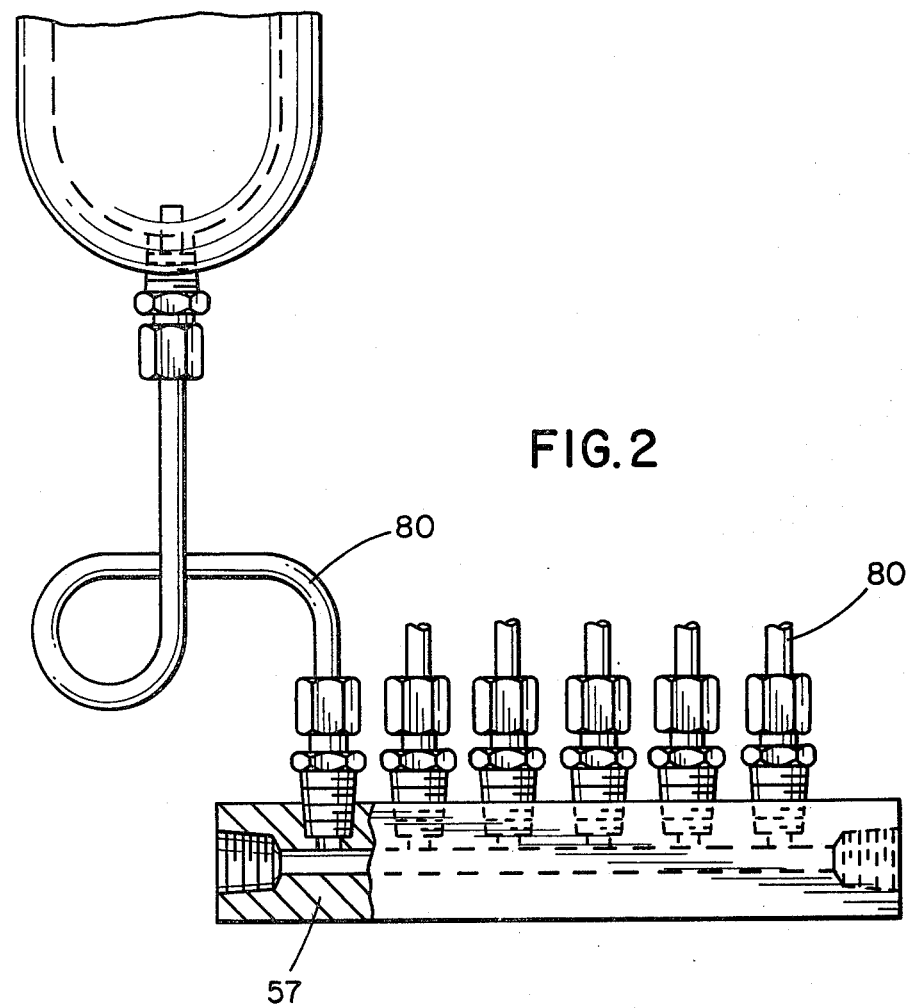

SUPPLEMENTARY FUEL INJECTION SYSTEM FOR A TURBOCHARGED INTERNAL COMBUSTION ENGINE

CROSS REFERENCE TO RELATED APPLICATION

This is a continuation-in-part application of Ser. No. 75,527 filed Sept. 12, 1979, now abandoned, entitled "Improved Method and Apparatus for Combustion of Supplemental Fuel (Alcohol) in a Turbocharged Diesel Engine" which is incorporated herewith by reference.

BACKGROUND OF THE INVENTION

In a principal aspect, the present invention relates to an improved diesel engine and more particularly to a turbocharged diesel engine capable of utilizing diesel fuel in combination with an auxiliary fuel to thereby improve efficiency and power of the engine while simultaneously prolonging engine life.

It is known that diesel engines are theoretically more efficient, require less maintenance and provide improved performance than corresponding internal combustion, reciprocating piston type engines. To further improve the efficiency and capacity of a diesel engine, it is also known that such engines may be turbocharged or supercharged. Turbocharging includes providing means for pressurizing the air flowing into the diesel engine intake manifold. Normally this is accomplished by a compressor driven by an impeller which, in turn, may be driven by the exhaust gases from the engine.

With the advent of increasing fuel costs and decreased availability of diesel fuel, alternative, less costly, fuel sources have been sought for such engines. Substitution of an alternative fuel, such as alcohol, for diesel fuel may result in an improved engine efficiency and life, as well as cost savings with respect to operation of the engine. The present invention relates to a system for turbocharging a diesel engine wherein dual fuels may be used in the engine to improve engine efficiency, life and power.

SUMMARY OF THE INVENTION

Briefly, the present invention comprises an improved multifuel turbocharger system for a diesel engine. The system includes a normal diesel fuel/air intake manifold which is turbocharged by means of a turbocharger operated by the exhaust gases from the engine. Additionally, an auxiliary fuel tank is provided which is pressurized by the turbocharger output. A fuel line from the auxiliary tank connects with an auxiliary pump which injects an auxiliary fuel/air mixture into the engine intake manifold once the turbocharger outlet pressure exceeds a threshold level. In a preferred embodiment, the auxiliary fuel is a mixture of water and alcohol which, when injected and combined with the pressurized air, provides for significantly increased power, improved efficiency, lower engine operating and exhaust temperatures and increased engine life.

Thus, it is an object of the present invention to provide an improved turbocharger system for a diesel engine.

It is a further object of the present invention to provide a dual fuel system for a diesel engine.

Still another object of the present invention is to provide a duel fuel system for a turbocharged diesel engine which automatically adjusts the mixture and amount of fuel to the engine in response to load demand on the engine.

Still another object of the present invention is to provide a turbocharger system which improves the efficiency of an engine by reducing fuel consumption and simultaneously increasing power per unit of fuel expended.

Still another object of the present invention is to provide a turbocharged engine of simplified construction which is easily incorporated into existing diesel engines.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 2 is a partial plan view of an auxiliary manifold for distributing the fuel/air mixture to the diesel engine manifold.

DESCRIPTION OF THE PREFERRED EMBODIMENT

Figure 1:
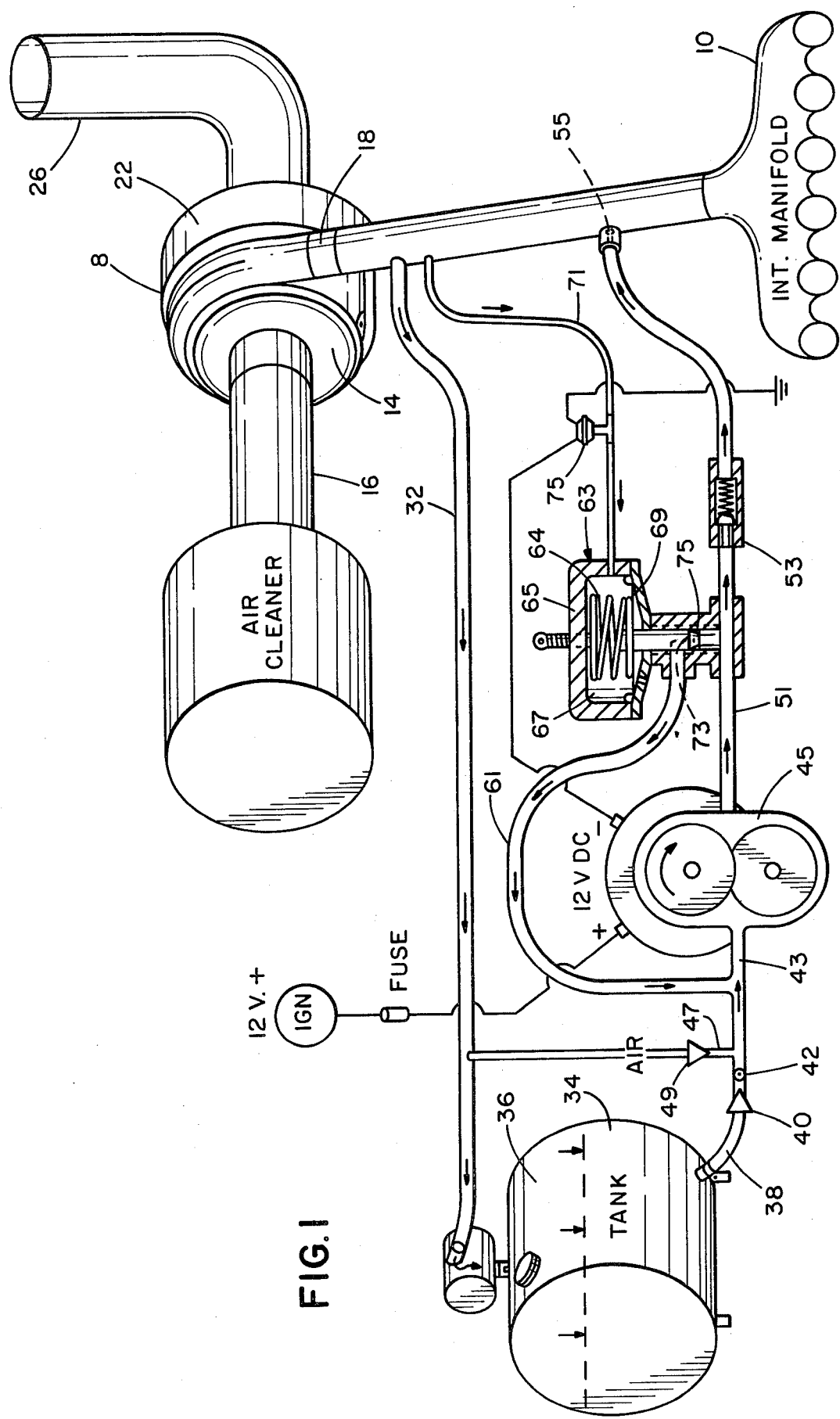
FIG. 1 is a schematic view of the improved turbocharger system.

The present invention is an improvement for a diesel engine of the type used in prime movers such as tractors, trucks and similar vehicles. Typically, diesel engines include an associated diesel fuel tank. A fuel pump removes diesel fuel from the tank, and that fuel is thereafter transported to the engine, mixed with air and compressed and exploded in the normal diesel cycle.

In order to increase the efficiency of a diesel engine, it is possible to provide a turbocharger which will pressurize the air before it is injected into the diesel engine. Typically such a turbocharger includes a compressor which receives the air, compresses that air and discharges it into the intake manifold for the diesel engine. The compressor is driven by an impeller, which may, in turn, be driven by the exhaust gases from the engine. Thus, as the temperature and pressure of the exhaust gases increase with increasing load and speed of the engine, the compressor increasingly pressurizes the air to the intake manifold. In this manner the efficiency and power output of the engine are increased.

The present invention significantly increases the efficiency and power of a diesel engine over and above that resulting from utilization of a turbocharger device alone. The present invention permits utilization of an auxiliary fuel, typically a water and alcohol mixture, in the diesel engine. As a result, less fossil fuel (diesel fuel) is required and the engine operates at a lower, more efficient temperature.

Referring to the drawing, the present invention incorporates a turbocharger 8 associated with a diesel engine having an intake manifold 10. Typically turbocharger 8 includes a compressor housing 14 having an inlet 16 to a compressor fan (not shown) and an outlet 18 connected to engine intake manifold 10. The compressor fan is driven by an impeller (not shown) mounted on a common shaft (not shown) within the compressor housing 14. The impeller is typically driven by exhaust gases flowing from the exhaust outlet of diesel engine through an exhaust inlet 22 to the impeller housing. The exhaust gases drive the impeller and are then discharged through exhaust outlet 26. The impeller is driven on common shaft with the compressor fan in the compressor housing 14. The pressurized air and auxiliary fuel mixture from the turbocharger is combined with diesel fuel in the engine, further pressurized and finally combusted.

With the present invention, a turbocharger outlet pressure sensing line 32 is connected to an enclosed, auxiliary fuel tank 34 and, more particularly, to an open top or chamber 36 in the tank 34. The remainder of the tank 34 is filled with an auxiliary fuel mixture, preferably of ethanol and water in a 1/1 ratio.

Note that any combustible auxiliary fuel may be used and stored in tank 34. However, a mixture of ethanol and water has been found to be particularly useful. The water tends to act as a heat sink and lowers the operating temperature of the diesel engine while increasing engine efficiency. The alcohol, as a fuel, significantly increases engine power. For farm applications if the farmer has an alcohol still, the fuel may be made by the farmer at a very low cost.

A fuel outlet line 38 connects through a pressure threshold valve 40 and a restrictor 42 to a fuel inlet line 43 leading to an auxiliary fuel pump 45. Pressure in the chamber 36 ultimately overcomes the threshold setting of valve 40 thereby causing auxiliary fuel to flow through the line 38, valve 40, restrictor 42 for combination with air through a line 47. A threshold check valve 49 in line 47 operates at the same pressure level as valve 40. Thus the air in line 47 is pressurized such as by connection to line 32.

Pump 45 pressurizes the fuel/air mixture and discharges the mixture through line 51. Line 51 connects through a threshold poppet check valve 53 to the intake manifold 10. In a first preferred embodiment, line 51 terminates with a nozzle spray tip 55 which injects the auxiliary fuel/air mixture into the upper end of intake manifold 10. In a second preferred embodiment discussed below with respect to FIG. 2, an intermediate manifold 57 is used.

The pump 45 includes a bypass loop or line 61 which recycles the fuel/air mixture in response to operation of bypass control valve 63. Valve 63 includes a housing 65 defining a chamber 67 with diaphragm 69. Boost line 71 connects the outlet pressure of the turbocharger 8 to chamber 67. The valve 63 also includes tapered valve member 73 cooperative with a tapered valve seat 75 in line 61. Thus, the member 73 controls flow in bypass line 61. The position of valve member 73 is, in turn, responsive to the downward force of boost pressure and adjustable spring 64 on diaphragm 69 and atmospheric pressure, as well as pressure in line 51 on the valve member 73 and diaphragm 69. As boost pressure increases, proportionally less of the fuel/air mix recyles via line 61.

Note that pump 45 is powered by the 12 volt power source of the tractor or prime mover and is operative only when a threshold boost pressure is sensed by control switch 75. Thus, the auxiliary fuel system remains isolated from the diesel engine until boost pressure reaches a set predetermined level.

As the load on the engine increases and the back pressure in manifold 10 increases, pressure in line 32 increases proportionally. This, in turn, increases in a directly proportional and measured manner, the amount of auxiliary fuel fed into the inlet 16.

FIG. 2 illustrates an alternative manifold assembly. An intermediate manifold 57 receives the pressurized fuel/air mixture via line 51. This mix is then discharge through each one of a series of separate lines 80 to a separate intake port of the diesel engine. Thus, auxiliary fuel is not mixed in the manifold 10 but is distributed directly to fuel inlet ports associated with the separate engine combustion chambers.

By use of an appropriate mixture of alcohol and water, it has been possible to increase the efficiency of a diesel engine in a marked manner. As an example, with a diesel engine made by International Harvester Corp. (International Model No. 986 series) having six cylinders and 436 cubic inch displacement, the horse power rating of the engine at a fixed RPM has been increased from 100 to 140 by use of the present invention. This engine is rated at 105 horse power measured at 1150 RPM at the power takeoff and 2400 RPM output from the engine. The exhaust gas temperature was simultaneously decreased from 1070° F. to 970° F. Following is a chart comparing (1) diesel engine output without turbocharging, (2) diesel engine output with turbocharging and (3) diesel engine output with the improved turbocharging and auxiliary fuel system of the present invention:

|     | Horse-power | RPM at Power Takeoff | Diesel Fuel Consumption (gallons/hour) | Exhaust Temp. |
| --- | --- | --- | --- | --- |
| (1) | 90  | 1150 | 7 gallons/hr. | 960° F. |
| (2) | 100 | 1150 | 7½ gallons/hr. | 1070° F. |
| (3) | 140 | 1150 | 7½ gallons/hr. | 970° F. |

While there has been set forth a preferred embodiment of the invention, it is to be understood that the invention is to be limited only by the following claims and their equivalents.

What is claimed is:

1. An improved multifuel turbocharger system for an engine of the type having an intake manifold for receipt of diesel fuel and air, said system comprising, in combination:

a turbocharger having an inlet for air, a compressor for compressing said air and an outlet to the diesel engine intake manifold;

an exhaust line from the engine connected to the turbocharger for driving the turbocharger;

an enclosed auxiliary fuel tank containing an auxiliary fuel mixture of alcohol and water;

a fluid pressure line connecting the turbocharger outlet to the auxiliary fuel tank for pressurizing the tank at the same pressure as the turbocharger outlet pressure;

an auxiliary fuel tank outlet line from the auxiliary fuel tank to the intake manifold; and pressure control means solely in the auxiliary fuel tank outlet line including means to prevent flow of the auxiliary fuel mixture to the intake manifold below a threshold pressure, and for operating the engine solely on diesel fuel and air combustion at low engine load; said pressure control means also including means for operating the engine on diesel fuel, air and a proportionally increasing auxiliary fuel mixture at increasing engine loads above said threshold pressure including restrictor means sized to permit auxiliary fuel flow directly proportionally responsive to the pressure of said turbocharger outlet to the auxiliary fuel tank to provide increased auxiliary fuel flow directly and proportionally in response to increased engine load above the threshold pressure level, air inlet means to the auxiliary fuel tank outlet line downstream from the restrictor means and a mechanical, auxiliary fuel and air pump downstream from the restrictor means for pumping the auxiliary fuel and air mixture into the intake manifold.

2. The system of claim 1 including a threshold pressure responsive control switch for the power source to the auxiliary pump.

3. The system of claim 1 including an auxiliary fuel and air bypass line connected with the opposite sides of the pump for recycling a portion of the auxiliary fuel and air mixture, said bypass line including a control valve responsive to the pressure differential between the turbocharger outlet and the auxiliary fuel tank outlet line.

4. The system of claim 1 including an auxiliary fuel and air bypass line connecting the auxiliary pump outlet with the pump inlet, and a flow control valve in the bypass line responsive to the turbocharger outlet pressure.

5. The system of claim 4 wherein the bypass control valve includes a variable orifice valve member which moves toward the closed position in response to increased turbocharger outlet pressure and toward the open position in response to increased auxiliary pump outlet pressure.

6. The system of claim 1 including an orifice spray injector from the auxiliary fuel tank outlet line directly into the fluid pressure line leading into the intake manifold.

7. The system of claim 1 including an intermediate distributor manifold in the auxiliary fuel outlet line upstream from the intake manifold for delivering auxiliary fuel and air mixture directly to the intake port of each cylinder of the engine.

* * * * *